US008666328B2

(12) United States Patent
Sanguinetti et al.

(10) Patent No.: US 8,666,328 B2
(45) Date of Patent: Mar. 4, 2014

(54) WIRELESS CIRCUITRY WITH REDUCED HARMONIC INTERFERENCE

(75) Inventors: Louie J. Sanguinetti, Los Gatos, CA (US); Ronald W. Dimpflmaier, Los Gatos, CA (US); Nicholas W. Lum, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 221 days.

(21) Appl. No.: 13/091,768

(22) Filed: Apr. 21, 2011

(65) Prior Publication Data

US 2012/0009887 A1   Jan. 12, 2012

Related U.S. Application Data

(60) Provisional application No. 61/363,485, filed on Jul. 12, 2010.

(51) Int. Cl.
   *H04B 1/44* (2006.01)

(52) U.S. Cl.
   USPC ............... 455/78; 455/83; 455/84; 455/552.1

(58) Field of Classification Search
   USPC ............. 455/78, 82, 83, 84, 88, 552.1, 553.1, 455/570, 112, 114.1, 114.2, 129
   See application file for complete search history.

(56) References Cited

U.S. PATENT DOCUMENTS

| 6,694,150 | B1 | 2/2004 | Standke et al. |
| 7,057,472 | B2 | 6/2006 | Fukamachi et al. |
| 7,512,388 | B2 | 3/2009 | Snider |
| 7,884,685 | B2 | 2/2011 | Ozden |
| 7,924,117 | B2 | 4/2011 | Kemmochi et al. |
| 2003/0092397 | A1 | 5/2003 | Uriu et al. |
| 2004/0224643 | A1 | 11/2004 | Nakai |
| 2004/0248614 | A1* | 12/2004 | Ella ............................ 455/552.1 |
| 2005/0245201 | A1* | 11/2005 | Ella et al. ........................ 455/78 |
| 2005/0245202 | A1* | 11/2005 | Ranta et al. ..................... 455/78 |

(Continued)

FOREIGN PATENT DOCUMENTS

EP   1551080   7/2005

OTHER PUBLICATIONS

Lum et al., U.S. Appl. No. 13/183,413, filed Jul. 14, 2011.

*Primary Examiner* — Ping Hsieh
(74) *Attorney, Agent, or Firm* — Treyz Law Group; G. Victor Treys; David C. Kellogg

(57) ABSTRACT

An electronic device has wireless communications circuitry that includes transmitters and receivers. Antenna structures may be coupled to the transmitters and receivers to support radio-frequency signal transmission and radio-frequency signal reception operations. Switching circuitry such as first and second radio-frequency switches may be used to support multiple communications bands of interest. A low band set of transmitters may be associated with the first switch and a high band set of transmitters may be associated with the second switch. The switches can be configured in real time to switch a desired communications band into use. As transmitted signals at frequency f pass through the switches, harmonics at 2f, 3f, and other integral multiples of the transmitted signals may be produced. A diplexer may be interposed between the switching circuitry and the antenna structures that prevents the harmonics from reaching the antenna structures.

18 Claims, 5 Drawing Sheets

(56) References Cited

U.S. PATENT DOCUMENTS

| | | | |
|---|---|---|---|
| 2005/0277387 A1* | 12/2005 | Kojima et al. | 455/78 |
| 2007/0077898 A1* | 4/2007 | Mueller et al. | 455/83 |
| 2007/0161357 A1 | 7/2007 | Tudosoiu et al. | |
| 2007/0230608 A1 | 10/2007 | Li | |
| 2009/0034504 A1 | 2/2009 | Uejima | |
| 2009/0207764 A1 | 8/2009 | Fukamachi et al. | |
| 2009/0285135 A1 | 11/2009 | Rousu et al. | |
| 2010/0067469 A1 | 3/2010 | Gaal et al. | |
| 2010/0157858 A1* | 6/2010 | Lee et al. | 370/297 |
| 2011/0006841 A1 | 1/2011 | Wyse et al. | |

* cited by examiner

WIRELESS CIRCUITRY WITH REDUCED HARMONIC INTERFERENCE

This application claims the benefit of provisional patent application No. 61/363,485, filed Jul. 12, 2010, which is hereby incorporated by reference herein in its entirety.

BACKGROUND

This relates generally to wireless communications circuitry, and more particularly, to circuitry in wireless electronic devices that reduces interference from frequency harmonics.

Electronic devices such as computers and cellular telephones are often provided with wireless communications capabilities. For example, electronic devices may use long-range wireless communications circuitry such as cellular telephone circuitry. Global Positioning System (GPS) receiver circuitry and other satellite receiver circuitry may be used to receive satellite navigation signals. Local wireless links may be used to support local area network communications such as IEEE 802.11 communications at 2.4 GHz and 5 GHz. Local links may also be used to handle Bluetooth® communications at 2.4 GHz.

It is often desirable for a device to support multiple bands. For example, users of a cellular telephone may desire to communicate with cellular telephone towers using one or more different cellular telephone bands and may desire to communicate with local area network equipment using wireless local area network (WLAN) communications bands.

When supporting multiple bands, it is sometimes desirable to use configurable switching circuitry to route signals. In a device having a transceiver with numerous transceiver ports, for example, a switch may be used to selectively couple a selected one of the transceiver ports to an antenna. This type of configuration allows the device to be configured in different ways, depending on the desired band of operation. If, for example, it is desired to use a first communications band, the switch may be placed in a first state that couples a first transceiver port to the antenna. When it is desired to use a second communications band, the switch may be placed in a second state that couples a second transceiver port to the antenna.

Radio-frequency switches may be based on components such as transistors that exhibit non-linear behavior. As a result, undesired frequency harmonics may be generated when radio-frequency signals are transmitted through a switch. For example, second harmonics, third harmonics, and higher-order harmonics of transmitted radio-frequency signals may be generated. If care is not taken, these harmonic signals may interfere with the operation of receiver circuitry in the device. For example, harmonics that are generated during transmission of cellular telephone signals may interfere with proper operation of a satellite navigation receiver or wireless local area network receiver.

It would therefore be desirable to be able provide improved circuitry for routing signals between radio-frequency transceiver ports and antenna structures in a wireless electronic device.

SUMMARY

An electronic device may be provided with wireless communications circuitry. The wireless communications circuitry may include radio-frequency transceiver circuitry for handling wireless communications. The radio-frequency transceiver may have multiple transmitters and multiple receivers. Antenna structures may be used to transmit and receive signals.

The antenna structures may be coupled to transmitters and receivers in the radio-frequency transceiver circuitry. Switching circuitry such as first and second radio-frequency switches may be used to support multiple communications bands of interest. The first and second radio-frequency switches may be configured in real time to switch desired frequencies into use.

A set of low band transmitters and receivers may be associated with the first switch and a set of high band transmitters and receivers may be associated with the second switch. As transmitted signals at frequency f pass through the switches, harmonics at 2f, 3f, and other integral multiples of the transmitted signals may be produced.

A diplexer may be interposed between the first and second switches and the antenna structures. The diplexer may have a first port that is coupled to the first radio-frequency switch, a second port that is coupled to the second radio-frequency switch, and a third port that is coupled to one or more antennas in the antenna structures.

The diplexer may include a low band filter associated with the low band transmitters and receivers and a high band filter associated with the high band transmitters and receivers. The low band filter may be a low pass filter that is coupled between the first switch and the antenna structures. The low pass filter may prevent transmitted signal harmonics that exit the first switch from reaching the antenna structures. The diplexer may include high band and low band filters that exhibit high degrees of linearity such as filters implemented on ceramic substrates. Highly linear filters such as filters with ceramic substrates may have a reduced tendency to produce undesired harmonics relative to other filter designs.

The high band filter may be a high pass filter or a band pass filter. When implemented using a bandpass filter, the high band filter may prevent transmitted signal harmonics that exit the second switch from reaching the antenna structures.

Further features of the invention, its nature and various advantages will be more apparent from the accompanying drawings and the following detailed description of the preferred embodiments.

DETAILED DESCRIPTION

Figure 1:
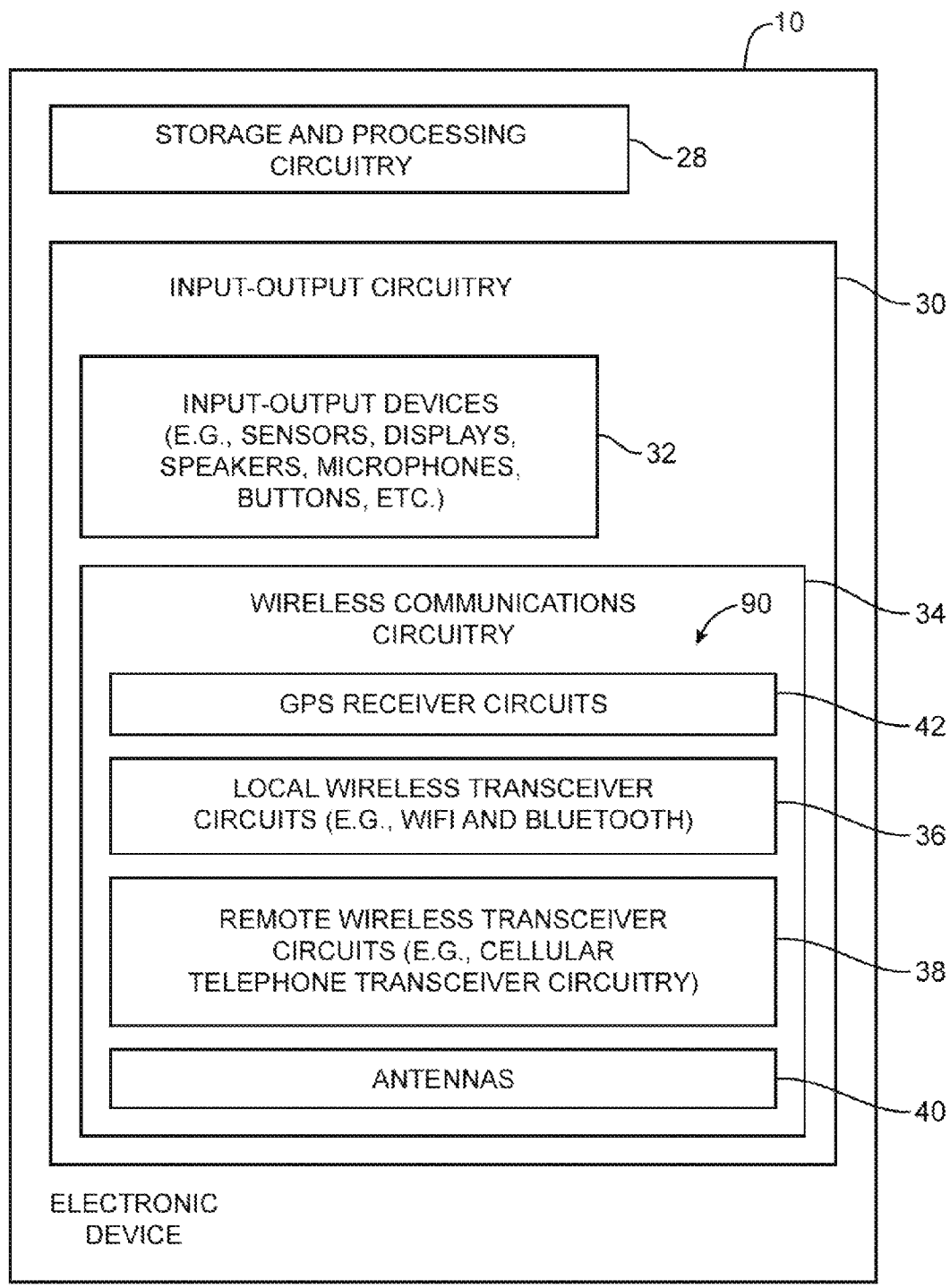
FIG. 1 is a schematic diagram of an illustrative electronic device with wireless communications circuitry in accordance with an embodiment of the present invention.

Electronic devices such as device 10 of FIG. 1 may be provided with wireless communications circuitry. The wireless communications circuitry may be used to support long-range wireless communications such as communications in cellular telephone bands. Examples of long-range (cellular telephone) bands that may be handled by device 10 include the 800 MHz band, the 850 MHz band, the 900 MHz band, the 1800 MHz band, the 1900 MHz band, the 2100 MHz band, the 700 MHz band, and other bands. The long-range bands used by device 10 may include the so-called LTE (Long Term Evolution) bands. The LTE bands are numbered (e.g., 1, 2, 3, etc.) and are sometimes referred to as E-UTRA operating bands. Long-range signals such as signals associated with satellite navigation bands may be received by the wireless communications circuitry of device 10. For example, device 10 may use wireless circuitry to receive signals in the 1575 MHz band associated with Global Positioning System (GPS) communications. Short-range wireless communications may also be supported by the wireless circuitry of device 10. For example, device 10 may include wireless circuitry for handling local area network links such as WiFi® links at 2.4 GHz and 5 GHz, Bluetooth® links at 2.4 GHz, etc.

As shown in FIG. 1, device 10 may include storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, functions related to communications band selection during radio-frequency transmission and reception operations, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols— sometimes referred to as WiFi®), protocols for other short-range wireless communications links such as the Bluetooth® protocol, cellular telephone protocols, MIMO (multiple input multiple output) protocols, antenna diversity protocols, etc. Wireless communications operations such as communications band selection operations may be controlled using software stored and running on device 10 (i.e., stored and running on storage and processing circuitry 28 and/or input-output circuitry 30).

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, click wheels, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as at 850 MHz, 900 MHz, 1800 MHz, 1900 MHz, and 2100 MHz and/or the LTE bands and other bands (as examples). Circuitry 38 may handle voice data and non-voice data.

Wireless communications circuitry 34 may include global positioning system (GPS) receiver equipment such as GPS receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include one or more antennas 40. Antennas 40 may be formed using any suitable antenna types. For example, antennas 40 may include antennas with resonating elements that are formed from loop antenna structure, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Antenna diversity schemes may be implemented in which multiple redundant antennas are used in handling communications for a particular band or bands. In an antenna diversity scheme, storage and processing circuitry 28 may select which antenna to use in real time based on signal strength measurements or other data. In multiple-input-multiple-output (MIMO) schemes, multiple antennas may be used to transmit and receive multiple data streams, thereby enhancing data throughput.

Figure 2:
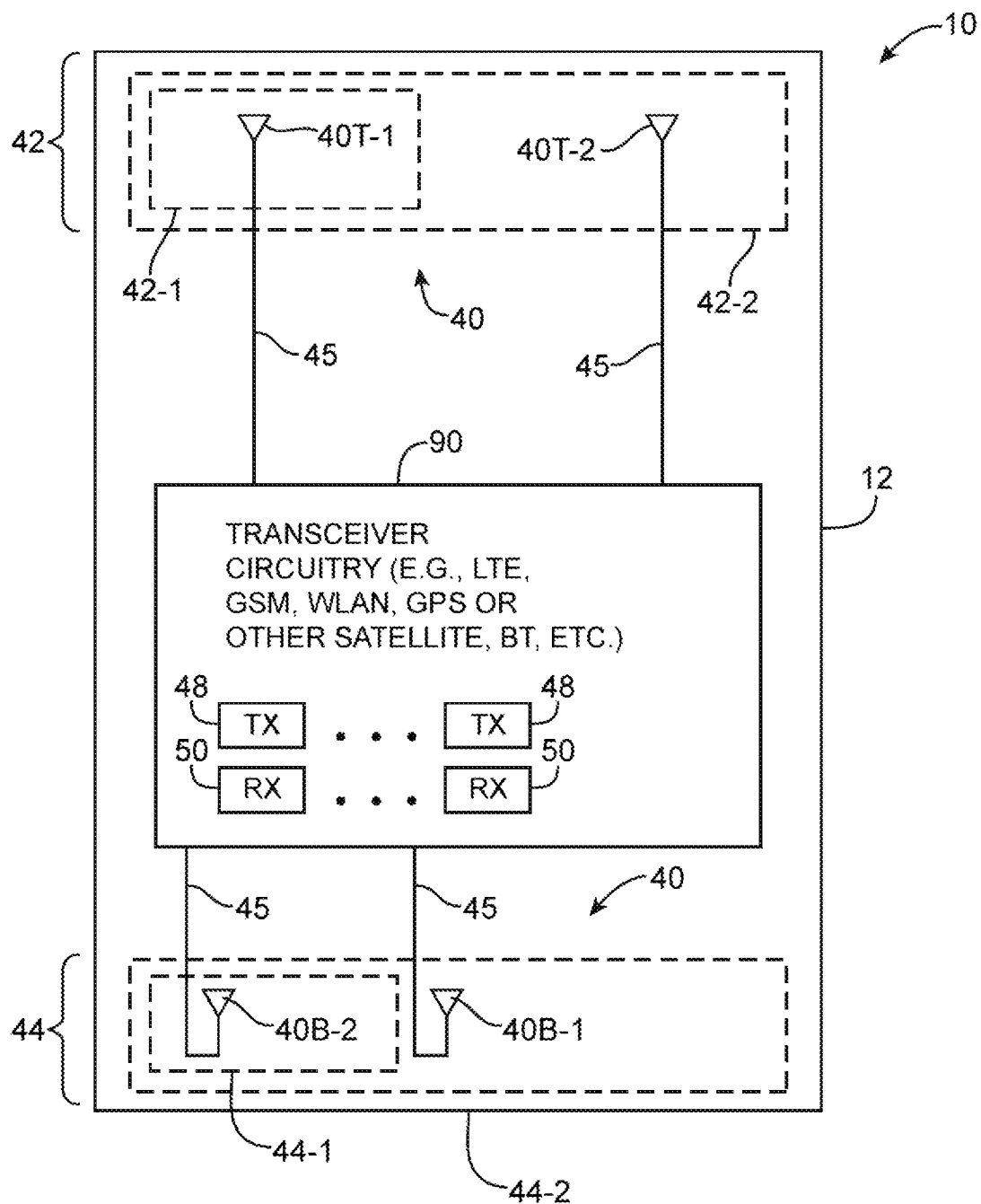
FIG. 2 is a diagram showing how radio-frequency transceiver circuitry may be coupled to one or more antennas within an electronic device of the type shown in FIG. 1 in accordance with an embodiment of the present invention.

Illustrative locations in which antennas 40 may be formed in device 10 are shown in FIG. 2. As shown in FIG. 2, electronic device 10 may have a housing such as housing 12. Housing 12 may include plastic walls, metal housing structures, structures formed from carbon-fiber materials or other composites, glass, ceramics, or other suitable materials. Housing 12 may be formed using a single piece of material (e.g., using a unibody configuration) or may be formed from a frame, housing walls, and other individual parts that are assembled to form a completed housing structure. The components of device 10 that are shown in FIG. 1 may be mounted within housing 12. Antenna structures 40 may be mounted within housing 12 and may, if desired, be formed using parts of housing 12. For example, housing 12 may include metal housing sidewalls, peripheral conductive members such as band-shaped members (with or without dielectric gaps), conductive bezels, and other conductive structures that may be used in forming antenna structures 40.

As shown in FIG. 2, antenna structures 40 may be coupled to transceiver circuitry 90 by paths such as paths 45. Paths 45 may include transmission line structures such as coaxial cables, microstrip transmission lines, stripline transmission lines, etc. Paths 45 may also include impedance matching circuitry, filter circuitry, and switching circuitry. Impedance matching circuitry may be used to ensure that antennas 40 are efficiently coupled to transceiver circuitry 90 in communications bands of interest. Filter circuitry may be used to implement frequency-based multiplexing circuits such as diplexers and triplexers. Switching circuitry may be used to selectively couple antennas 40 to desired ports of transceiver circuitry 90. For example, in one operating mode a switch may be configured to route one of paths 45 to a given antenna and in another operating mode the switch may be configured to route a different one of paths 45 to the given antenna. The use of switching circuitry between transceiver circuitry 90 and antennas 40 allows device 10 to support multiple communications bands of interest with a limited number of antennas.

In a device such as a cellular telephone that has an elongated rectangular outline, it may be desirable to place antennas 40 at one or both ends of the device. As shown in FIG. 2, for example, some of antennas 40 may be placed in upper end region 42 of housing 12 and some of antennas 40 may be placed in lower end region 44 of housing 12. The antenna structures in device 10 may include a single antenna in region 42, a single antenna in region 44, multiple antennas in region 42, multiple antennas in region 44, or may include one or more antennas located elsewhere in housing 12.

Antenna structures 40 may be formed within some or all of regions such as regions 42 and 44. For example, an antenna such as antenna 40T-1 may be located within region 42-1 or an antenna such as antenna 40T-2 may be formed that fills some or all of region 42-1. An antenna such as antenna 40B-1 may fill some or all of region 44-2 or an antenna such as antenna 40B-2 may be formed in region 44-1. These types of arrangements need not be mutually exclusive. For example, region 44 may contain a first antenna such as antenna 40B-1 and a second antenna such as antenna 40B-2.

Transceiver circuitry 90 may contain transmitters such as transmitters 48 and receivers such as receivers 50. Transmitters 48 and receivers 50 may be implemented using one or more integrated circuits (e.g., cellular telephone communications circuits, wireless local area network communications circuits, circuits for Bluetooth® communications, circuits for receiving satellite navigation system signals, power amplifier circuits for increasing transmitted signal power, low noise amplifier circuits for increasing signal power in received signals, other suitable wireless communications circuits, and combinations of these circuits).

Device 10 may be a relatively large device (e.g. the lateral dimensions of housing 12 may be tens of centimeters or larger) or may be a relatively compact device such as a handheld device that has a longitudinal dimension along the main axis of housing 12 that is 15 cm or less, 10 cm or less, or 5 cm or less, and that has smaller transverse dimensions. In miniature devices such as wrist-mounted, pendant, and clip-mounted devices, the dimensions of housing 12 may be 10 cm or less or 5 cm or less (as examples).

Particularly in housings for device 10 that are compact, it may be difficult or impossible to widely separate various antennas from each other. For example, some antennas (e.g., antennas 40T-1 and 40T-2 in the example of FIG. 2) may be located adjacent to each other within housing 12. Other antennas (e.g., the antenna structures of region 42 and the antenna structures of region 44) may be separated only by the relatively modest length of device 10.

Due to the close proximity of the antennas within device 10 in at least some device configurations, there may be a potential for interference between bands. This potential for interference may be exacerbated by the presence of the circuitry in paths 45, which may generate undesirable frequency harmonics. For example, switches in paths 45 may have non-linear properties that lead to the generation of second harmonics, third harmonics, and higher-order harmonics when passing radio-frequency signals.

During data transmission operations, radio-frequency signals that are generated by transceiver 90 may are transmitted through paths 45 to antennas 40. Transmitted signals may, for example, be generated at a frequency f at one of the ports associated with transceiver 90. Frequency f may be associated with a cellular telephone band or other frequency of interest. Paths 45 may contain a switch such as a transistor-based switch. As the signals at frequency f pass through the switch (and other non-linear circuit elements in paths 45), frequency harmonics may be generated at frequencies such as 2f, 3f, 4f, and higher. In this situation, a signal harmonic at 2f, 3f, 4f, or higher might be transmitted from one antenna (e.g., a cellular telephone antenna) at the same time that signals at frequency f are being transmitted. The frequency harmonics at 2f, 3f, and 4f might then be received by another antenna in the device (e.g., a wireless local area network antenna or satellite navigation antenna). If care is not taken, the received signals at harmonic frequencies of frequency f may cause undesirable interference. For example, a received signal at 2f, 3f, or 4f might fall within or near a communications band of one of receivers 50 (e.g., a wireless local area network receiver or satellite navigation system receiver). Left uncorrected, the presence of this type of interference may prevent satisfactory simultaneous operation of the transmitter at frequency f and the receiver operating at 2f, 3f, 4f, or other harmonic.

Device 10 can reduce or eliminate this type of undesirable interference by including filtering circuitry in paths 45 that blocks harmonics associated with transmitted signals before they reach antennas 40. Because the magnitude of transmitted harmonics is substantially reduced, the magnitude of any harmonics that are received by other antenna and receiver circuitry in device 10 is substantially reduced. By effectively preventing harmonics from being transmitted, the potential for signal interference is eliminated and satisfactory device operation is ensured.

The filtering circuitry may include a diplexer filter that is used to multiplex low band and high band transmitted signals onto a common transmit path. During signal reception operations, the diplexer demultiplexes received signals based on their frequency. The diplexer may include a low pass filter that is coupled to low band transceiver ports through a low band switch. The diplexer may also include a high pass filter or a bandpass filter that is coupled to high band transceiver ports through a high band switch.

Even if harmonics are generated in the switches, the harmonics will be blocked by the filtering circuitry of the diplexer. For example, consider a low band frequency such as frequency f. As a signal at this frequency passes through the low band switch, harmonic signals at 2f, 3f, and 4f may be generated. By proper configuration of the cutoff frequency of the low pass filter, signal frequency f will fall within the pass band of the low pass filter, but signal frequencies 2f, 3f, and 4f will fall outside of the pass band and will be attenuated. Because the low pass filter blocks undesired harmonic frequencies, receivers 50 in device 10 that operate at or near harmonic frequencies (e.g., 2f, 3f, 4f, and higher) will not be subject to harmonic interference and can operate at the same time as the transmitter operating at frequency f. Frequency harmonics generated when transmitting signals from the high band transceiver through the high band switch can likewise be attenuated by the high-frequency attenuation properties of the high-band filter (i.e., when the high-band filter is implemented using a bandpass filter that passes desired high-band frequencies while attenuating harmonics of these desired high-band frequencies).

A filtering arrangement based on a diplexer scheme of this type may exhibit lower insertion loss than filtering arrangements based on components with higher insertion losses such as notch filters. If desired, additional filtering circuitry may be used in device 10. In general, the filtering circuitry in paths 45 may, include diplexers, triplexers, notch filters, bandpass filters, low pass filters, high pass filters, other filter components, and combinations of filter circuits such as these. Filtering components may, for example, be implemented using surface acoustic wave (SAW) or bulk acoustic wave (BAW) devices.

Figure 3:
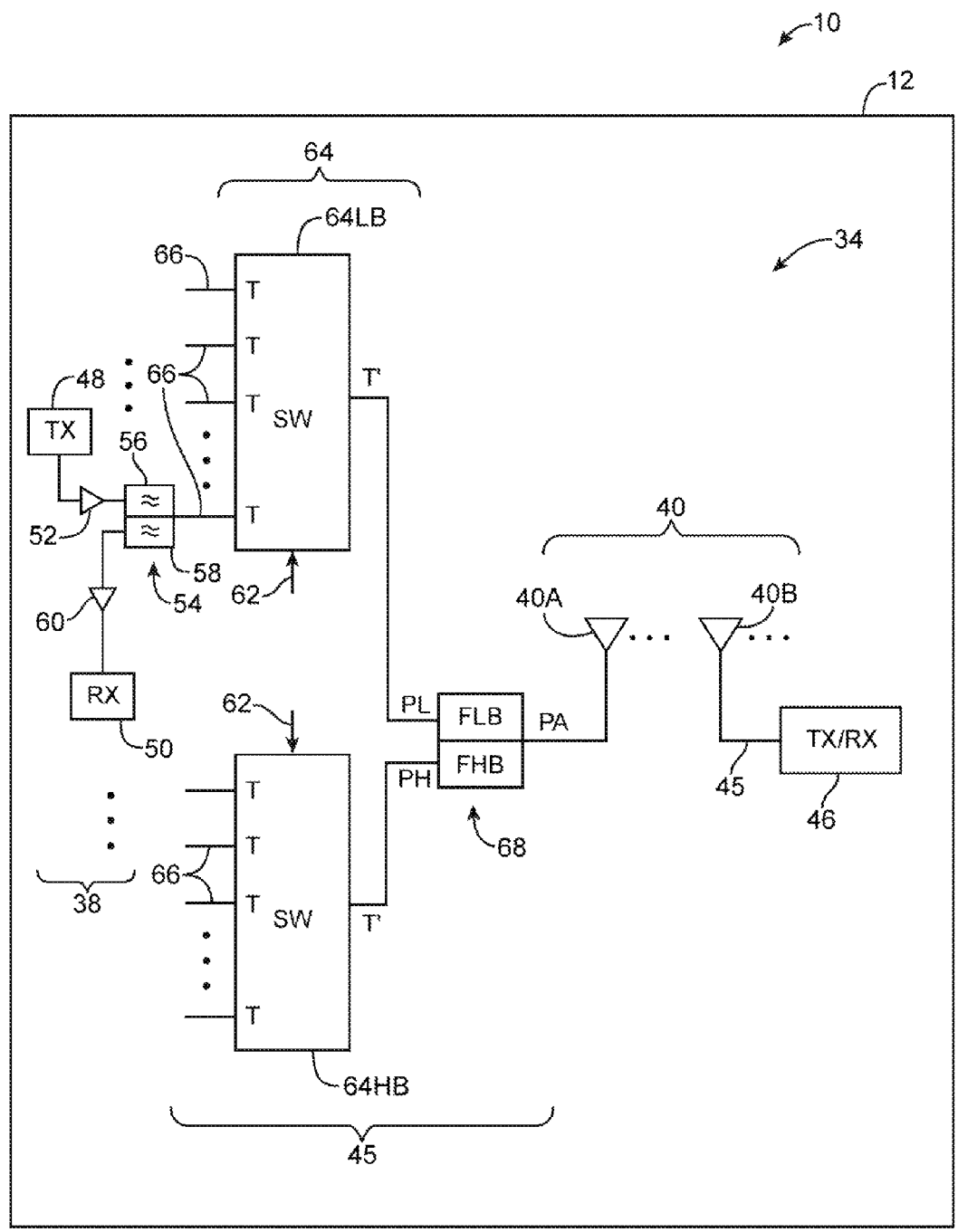
FIG. 3 is a circuit diagram of illustrative wireless communications circuitry of the type that may be used in handling wireless communications in the electronic device of FIG. 1 in accordance with an embodiment of the present invention.

An illustrative configuration that may be used for wireless communications circuitry 34 is shown in FIG. 3. As shown in FIG. 3, device 10 may include antennas 40 in housing 12. Antennas 40 may be coupled to transceiver circuitry 38 and 46 using paths 45. Paths 45 may include switching circuitry 64.

Antennas 40 may include one or more antennas. One or more antennas 40 may, for example, be used for cellular telephone communications bands, one or more antennas 40 may be used for satellite navigation system bands such as the GPS band at 1575 MHz, and one or more antennas 40 may be used for other communications bands of interest (e.g. the IEEE 802.11 bands at 2.4 GHz and 5 GHz or other wireless local area network bands, the Bluetooth® band at 2.4 GHz, etc.). In a configuration of the type shown in the example of FIG. 3, one or more antennas such as antenna 40A may be associated with wireless transceiver circuitry such as remote wireless transceiver circuitry 38 (e.g., one or more cellular telephone transceiver circuits) and one or more antennas such as antenna 40B may be associated with wireless transceiver circuitry 46 (e.g., satellite navigation system receiver 42 of FIG. 1, local wireless transceiver circuits 36 of FIG. 1 such as IEEE 802.11 wireless local area network circuits, Bluetooth® circuits, etc.). Additional antennas may be associated with transceiver circuitry 38 (i.e., antennas in addition to antenna 40A) and additional antennas may be associated with transceiver circuitry 46 (i.e., antennas in addition to antenna 40B), if desired.

Transceiver circuitry 38 may include transmitters 48 and receivers 50. There may be, for example, a respective transmitter 48 and a respective receiver 50 associated with each of a plurality of cellular telephone communications bands. Consider, as an example, LTE Band 13. To support communications in E-UTRA (LTE) Band 13, one of transmitters 48 (e.g., transmitter TX of FIG. 3) may transmit radio-frequency signals in the uplink frequency range of 777 MHz to 787 MHz and one of receivers 50 (e.g., receiver RX of FIG. 3) may receive radio-frequency signals in the downlink frequency range of 746 MHz to 756 MHz. To increase transmit power before transmitted radio-frequency signals reach antennas 40, paths 45 may include power amplifiers such as power amplifier 52. To increase the strength of signals that have been received from antennas 40, paths 45 may include low noise amplifiers (LNAs) such as low noise amplifier 60. Amplifiers such as amplifiers 52 and 60 may be implemented using discrete components, using circuitry that is part of a transceiver integrated circuit, etc.

Switching circuitry 64 may include multiple switches each of which is associated with a respective frequency range. In the example of FIG. 3, switching circuitry 64 includes first switch 64LB and second switch 64HB. The states of switches 64LB and 64HB (i.e., which terminals are connected to each other in the switches) may be controlled by using storage and processing circuitry 28 to apply control signals to control terminals 62. Switch 64LB may be used to handle radio-frequency signals with lower frequencies than switch 64HB. With this type of arrangement, switch 64LB may sometimes be referred to as a low band switch and switch 64HB may sometimes be referred to as a high band switch.

Switches 64LB and 64HB preferably have a sufficient number of terminals (switch ports) to allow all desired transmitters 48 and receivers 50 to be coupled to antennas 40. In a typical configuration, switches 64LB and 64HB may be SP0T (single pole four throw) or SP5T (single pole five throw) switches (as an example). Switches with more terminals or fewer terminals may be used if desired.

Each switch has one terminal T' that is coupled to diplexer 68 and a plurality of other terminals T that are each coupled to a respective portion of transceiver circuitry 38. In a typical configuration, each transmitter and receiver pair in transceiver circuitry 38 is coupled to a respective terminal T in switch 64LB or 64HB using a component such as diplexer 54. With this type of arrangement, transmit and receive signals for each band of interest are associated with a respective switch terminal T.

In the example of FIG. 3, low band switch 64LB has a plurality of terminals T each of which is coupled to a respective transmitter 48 and receiver 50 by a respective path 66 and associated filter circuitry such as diplexer 54. For example, transmitter TX may be connected to filter 56 in diplexer 54 and receiver RX may be connected to filter 58 in diplexer 54. Filter 56 may be a high pass filter that passes signals in the uplink range of Band 13 and filter 58 may be a low pass filter that passes signals in the downlink range of Band 13.

Diplexer 54 may be coupled to a given one of terminals T in low band switch 64LB by one of paths 66. Transmitted signals from transmitter TX in the uplink frequency range for Band 13 may be routed to the given terminal T by power amplifier 52 and filter 56 of diplexer 54. Received signals in the downlink frequency range for Band 13 may be routed from the given terminal T to receiver RX by filter 58 and low noise amplifier 60. Other bands (e.g., other LTE bands, GSM bands, etc.) may be handled using their own respective transmitters 48, power amplifiers 52, receivers 50, low noise amplifiers 60, and diplexers 54.

The transceiver circuitry for a first set of the frequency bands handled by transceiver circuitry 38 (e.g., the lower frequency bands) may be coupled to the terminals T of low band switch 64LB. The transceiver circuitry for a second set of the frequency bands handled by transceiver circuitry 38 (e.g., the higher frequency bands) may be coupled to the terminals T of high band switch 64HB. With one suitable arrangement, frequencies below about 960 MHz may be handled by low band switch 64LB and frequencies above about 1710 MHz may be handled by high band switch 64HB. Other configurations may be used in wireless circuitry 34 if desired. These frequency assignments are merely illustrative.

Diplexer 68 may have filters FLB and FHB and ports (terminals) PL, PH, and PA. Terminal T' of switch 64LB may be coupled to port PL. Terminal T' of switch 64HB may be coupled to port PH. Port PA of diplexer 68 may be coupled to antenna 40A. Filter FLB may be a low pass filter. Filter FHB may be a high pass filter or a bandpass filter. Diplexer 68 may use filters FLB and FHB to route radio-frequency signals between switching circuitry 64 and antenna 40A according to frequency, while blocking undesired signal harmonics.

Figure 4:
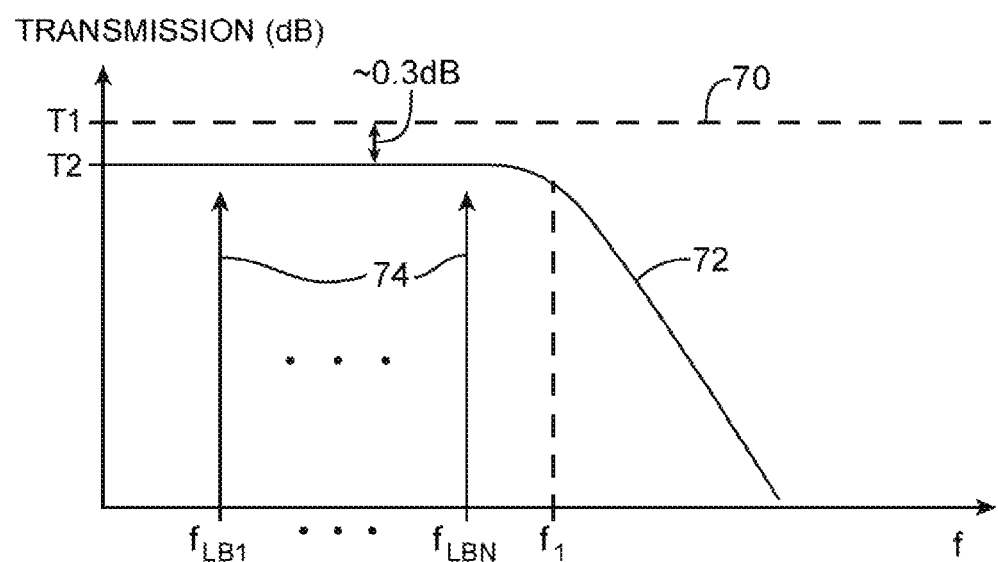
FIG. 4 is a graph of radio-frequency signal transmission as a function of operating frequency for an illustrative low band filter that may be used in a diplexer within the wireless circuitry of FIG. 3 in accordance with an embodiment of the present invention.

FIG. 4 is a graph showing an illustrative radio-frequency signal transmission characteristic that may be associated with filter FLB. As shown in FIG. 4, filter FLB may be a low pass filter that passes signals with frequencies f below frequency f1. The value of f1 may be, for example, 960 MHz or other frequency that is above the frequencies $f_{LB1} \ldots f_{LBN}$ of the communications bands that are being transmitted and received via switch 64LB. Using low pass filter FLB, diplexer 68 may exhibit an insertion loss of about 0.3 dB between ports PL and PA (i.e., maximum transmission value T2 of filter FLB may be about 0.3 dB below 100% transmission level T1, as indicated by the gap between 100% transmission curve 70 and transmission curve 72 of filter FLB.

Figure 5:
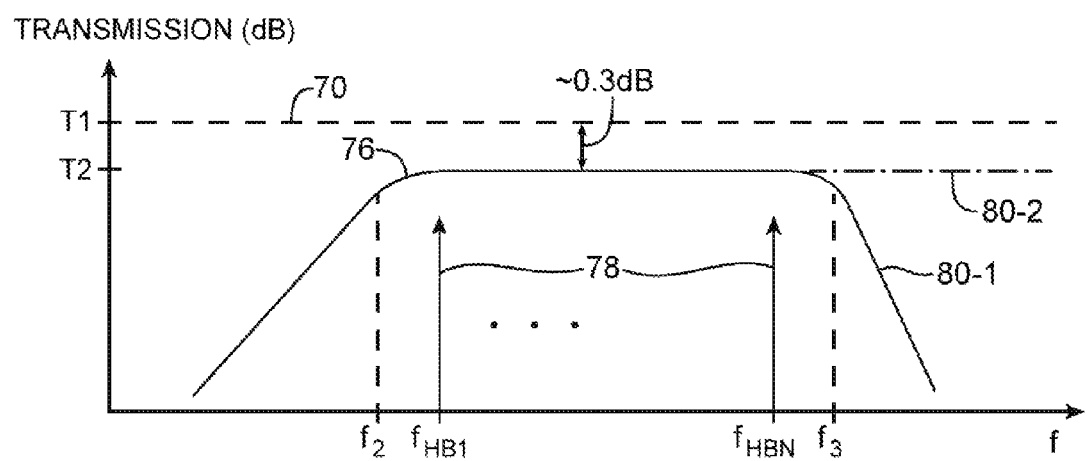
FIG. 5 is a graph of radio-frequency signal transmission as a function of operating frequency for an illustrative high band filter that may be used in a diplexer within the wireless circuitry of FIG. 3 in accordance with an embodiment of the present invention.

FIG. 5 is a graph showing an illustrative radio-frequency signal transmission characteristic that may be associated with filter FHB. As shown in FIG. 5, filter FLB may be a high pass filter (see, e.g., curve 76 and curve portion 80-2) or a bandpass filter (see, e.g., curve 76 and curve portion 80-1) that passes signals with frequencies f above frequency f2. The value of f2 may be, for example, 1710 MHz or other frequency that is below the frequencies $f_{HB1} \ldots f_{HBN}$ of the communications bands that are being transmitted and received via switch 64HB. Using high pass filter (or bandpass filter) FLB, diplexer 68 may exhibit an insertion loss of about 0.3 dB between ports PH and PA. As shown in FIG. 5, for example, the maximum transmission value T2 of filter FHB may be about 0.3 dB below 100% transmission level T1, as indicated by the gap between 100% transmission curve 70 and transmission curve 76 of filter FHB (diplexer 68). The insertion losses associated with diplexer 68 may be somewhat higher or lower than the illustrative 0.3 dB insertion loss shown in FIGS. 4 and 5. Nevertheless, the insertion losses associated with use of a diplexer such as diplexer 68 will generally be significantly less than the insertion losses that would result if other types of filtering circuitry such as notch filters were to be interposed between switching circuitry 64 and antenna 40A.

Switching circuitry 64 may be implemented using switches 64A and 64B that include gallium arsenide field-effect transistors (FETs), microelectromechanical systems (MEMS) switches, metal-oxide-semiconductor field-effect transistors (MOSFETs), p-i-n diodes, high-electron mobility transistors (HEMTs), pseudomorphic HEMT (PHEMTs), transistors formed on a silicon-on-insulator (SOI) substrate, etc. When radio-frequency signals are transmitted from transmitters 48 to antenna 40A, the transmitted signals pass through switching circuitry 64. Nonlinearities in the behavior of switching circuitry 64 may generate harmonics at terminals T' (i.e., at the outputs of the switches). The filters of diplexer 68 can significantly attenuate these harmonics, so that the harmonics are not transmitted through antenna 40A and are therefore not received by antenna 40B. Because antenna 40B does not receive harmonics of any significant magnitude, the receivers associated with transceiver 46 (i.e., wireless local area network receiver circuitry, satellite navigation receiver circuitry, etc.) will operate properly without interference from the operation of transceiver circuitry 38.

Consider, as an example, a situation in which the communications bands that pass through low band switch 64LB and low pass filter FLB (i.e., bands 74 at frequencies $f_{LB1} \ldots f_{LBN}$ of FIG. 4) are associated with LTE bands such as some or all of Bands 5, 8, 17, 13, and 20 (and, if desired, other LTE bands and/or other cellular telephone bands), whereas the communications bands that pass through high band switch 64HB and high pass filter (or bandpass filter) HLB (i.e., bands 78 at frequencies $f_{HB1} \ldots f_{HBN}$ of FIG. 5) are associated with LTE bands such as some or all of Bands 4, 2, 7, 1, 3, and 40 (and, if desired, other LTE bands and/or other cellular telephone bands). In a configuration of this type, harmonics of some of the transmitted LTE bands may fall within IEEE 802.11 (WiFi®) bands at 2.4 GHz and 5 GHz and/or satellite navigation system bands such as the GPS band at 1575 MHz. For example, the uplink (transmit) band associated with Band 13 extends from 777 MHz to 787 MHz. When Band 13 traffic is transmitted by transceiver circuitry (e.g., transmitter TX of FIG. 3), switch 64LB may generate harmonics such as second harmonics in the frequency range of 1554 MHz to 1574 MHz. If not attenuated by diplexer 68, these second harmonics (particularly the harmonic signals near 1574 MHz) might interfere with the GPS band centered at 1575 MHz (i.e., the GPS receiver coupled to antenna 40A). By using diplexer 68, however, the second harmonics in the frequency range of 1554 MHz to 1574 MHz are attenuated significantly (e.g., by 15 dB or more, by 30 dB or more, etc.). As shown in FIG. 4, for example, low pass filter FLB significantly attenuates signals at frequencies above f1 (e.g., above 960 MHz or other suitable cutoff frequency).

The third harmonics of LTE bands 1, 3, 4, and 2 may represent a possible source of interference with the IEEE 802.11 wireless local area network band at 5 GHz. When signals in these LTE bands are transmitted through switch 64HB, third harmonics in the vicinity of 5 GHz may be produced. As indicated by curve 76 and, in particular, curve segment 80-1 of FIG. 5, when filter FHB is implemented as a bandpass filter (i.e., when filter FHB passes signals in a frequency range f2 to f3 of about 1710 MHz to 2.25 GHz), signals above 2.25 GHz (i.e., the harmonics in the vicinity of 5 GHz) will be attenuated by filter FHB. As with the second harmonics of Band 13 that are attenuated by filter FLB, these harmonics will not reach antenna 40B. Because diplexer 68 prevents transmitted signal harmonics from being transmitted through antenna 40B, these harmonics will not be received by antenna 40A, even when antennas 40A and 40B are located within the same device (e.g., at ends 44 and 42, respectively) and are potentially in close proximity to each other (e.g., 15 cm or less apart, etc.).

If desired, the lower cutoff frequency f2 and upper cutoff frequency f3 of high band filter FHB may be lower or higher to accommodate different transmitted bands. If no receiver is used in device 10 at 5 GHz, filter FHB may be implemented using a high pass filter (i.e., filter with a low frequency cutoff such as frequency f2 of FIG. 5, but no sharp upper frequency cutoff such as frequency f3 so that curve 76 follows segment 80-2 above f3). Low band filter FLB can be implemented using different cutoff frequencies. The use of a 960 MHz cutoff frequency for frequency f1 of FIG. 1 is presented as an example.

The foregoing is merely illustrative of the principles of this invention and various modifications can be made by those skilled in the art without departing from the scope and spirit of the invention. The foregoing embodiments may be implemented individually or in any combination.

What is claimed is:
1. Wireless circuitry, comprising:
   a first set of radio-frequency transmitters that operate in a first set of communications bands, wherein the first set of radio-frequency transmitters includes a Long Term Evolution (LTE) cellular telephone transmitter;

a second set of radio-frequency transmitters that operate in a second set of communications bands;

a first switch having a plurality of first switch terminals each of which is coupled to a respective one of the radio-frequency transmitters in the first set of radio-frequency transmitters and having an additional terminal to which a selected one of the plurality of first switch terminals is connected;

a second switch having a plurality of second switch terminals each of which is coupled to a respective one of the radio-frequency transmitters in the second set of radio-frequency transmitters and having an additional terminal to which a selected one of the plurality of second switch terminals is connected;

an antenna; and a diplexer having a first port that is coupled to the additional terminal of the first switch, a second port that is coupled to the additional terminal of the second switch, and a third port that is coupled to the antenna.

2. The wireless circuitry defined in claim 1 wherein the Long Term Evolution (LTE) cellular telephone transmitter operates in LTE Band 13.

3. The wireless circuitry defined in claim 1 wherein the diplexer includes a low pass filter and a high pass filter.

4. The wireless circuitry defined in claim 3 wherein the Long Term Evolution (LTE) cellular telephone transmitter operates in LTE Band 13 and produces transmitted signals at frequency f and wherein the low pass filter prevents signals at 2f from reaching the antenna.

5. The wireless circuitry defined in claim 3 wherein the first set of radio-frequency transmitters includes a cellular telephone transmitter that produces transmitted signals at frequency f and wherein the low pass filter prevents signals at 2f from reaching the antenna.

6. The wireless circuitry defined in claim 1 wherein the diplexer includes a low pass filter and a bandpass filter.

7. The wireless circuitry defined in claim 6 wherein the second set of radio-frequency transmitters includes an additional Long Term Evolution (LTE) cellular telephone transmitter operating in an LTE Band selected from the group of bands consisting of: Band 1, Band 3, Band 4, and Band 2, wherein the additional LTE cellular telephone transmitter produces transmitted signals at a frequency f, and wherein the bandpass filter prevents signals at a frequency of 3f from reaching the antenna.

8. The wireless circuitry defined in claim 7 wherein the LTE cellular telephone transmitter in the first set of radio-frequency transmitters operates in LTE Band 13 and produces signals in LTE Band 13 and wherein the low pass filter prevents signals at a second harmonic of the signals in LTE Band 13 from reaching the antenna.

9. The wireless circuitry defined in claim 1 further comprising:

a first set of radio-frequency receivers, wherein each of the radio-frequency receivers in the first set of radio-frequency receivers is coupled, together with a respective one of the radio-frequency transmitters in the first set of radio-frequency transmitters, to a respective one of the first switch terminals in the first switch; and a second set of radio-frequency receivers, wherein each of the radio-frequency receivers in the second set of radio-frequency receivers is coupled, together with a respective one of the radio-frequency transmitters in the second set of radio-frequency transmitters, to a respective one of the second switch terminals in the second switch.

10. An electronic device, comprising:

a first antenna;

a receiver that receives signals in at least a first communications band through the first antenna;

a second antenna;

a plurality of pairs of radio-frequency receivers and transmitters, wherein a given one of the transmitters transmits signals at a frequency f through the second antenna;

a diplexer having a first port, a second port, and a third port that is coupled to the second antenna;

a first radio-frequency switch that is coupled to the first port; and a second radio-frequency switch that is coupled between the plurality of pairs of the radio-frequency receivers and transmitters and the second port, wherein the diplexer prevents signals at harmonics of the frequency f from reaching the second antenna and from reaching the receiver through the first antenna and wherein the second radio-frequency switch has a plurality of switch terminals each of which is coupled to a respective pair of the pairs of the radio-frequency receivers and transmitters and has an additional terminal coupled to the second port and to which a selected one of the plurality of switch terminals is coupled.

11. The electronic device defined in claim 10 wherein the receiver is configured to receive Global Positioning System signals at 1575 MHz and wherein the diplexer comprises a low-pass filter that prevents signals at a frequency of 2f that are produced in the second radio-frequency switch in response to the transmission of the signals at the frequency f from the radio-frequency transmitter from reaching the second antenna.

12. The electronic device defined in claim 10 wherein the receiver is configured to receive IEEE 802.11 signals at 5 GHz and wherein the diplexer comprises a bandpass filter that prevents signals at a frequency of 3f that are produced in the second radio-frequency switch in response to the transmission of the signals at the frequency f from the radio-frequency transmitter from reaching the second antenna.

13. The electronic device defined in claim 10 wherein the diplexer includes a low pass filter and a high pass filter.

14. The electronic device defined in claim 10 wherein the diplexer includes a low pass filter and a bandpass filter.

15. The electronic device defined in claim 14 wherein the radio-frequency transmitter comprises a cellular telephone transmitter that produces transmitted signals at frequency f and wherein the low pass filter prevents signals at 2f from reaching the antenna.

16. The electronic device defined in claim 10 wherein the receiver comprises satellite receiver circuitry that receives satellite navigation signals through the first antenna.

17. The electronic device defined in claim 10 wherein the radio-frequency transmitter comprises a Long Term Evolution (LTE) cellular telephone transmitter operating in LTE Band 13.

18. Wireless circuitry, comprising:

a set of radio-frequency transmitters that operate in a set of communications bands;

a switch having a plurality of switch terminals each of which is coupled to a respective one of the radio-frequency transmitters in the set of radio-frequency transmitters and having an additional terminal to which a selected one of the plurality of switch terminals is connected;

an antenna;

a diplexer having a first port that is coupled to the additional terminal of the switch, a second port, and a third port that is coupled to the antenna;

satellite receiver circuitry that receives satellite navigation signals through the antenna, wherein the set of radio-frequency transmitters comprises a first set of radio-frequency transmitters and wherein the set of communications bands comprises a first set of communications band;

a second set of radio-frequency transmitters that operate in a second set of communications bands, wherein the switch comprises a first switch; and a second switch having a plurality of switch terminals each of which is coupled to a respective one of the radio-frequency transmitters in the second set of radio-frequency transmitters and having an additional terminal to which a selected one of the plurality of second switch terminals is connected, wherein the second port of the diplexer is coupled to the additional terminal of the second switch.

* * * * *